(12) United States Patent
Jung et al.

(10) Patent No.: US 12,445,767 B2
(45) Date of Patent: Oct. 14, 2025

(54) ELECTRONIC DEVICE COMPRISING SPEAKER MODULE

(71) Applicant: Samsung Electronics Co., Ltd., Suwon-si (KR)

(72) Inventors: Kiyoung Jung, Suwon-si (KR); Jungchul An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 18/315,144

(22) Filed: May 10, 2023

(65) Prior Publication Data

US 2023/0283948 A1    Sep. 7, 2023

Related U.S. Application Data

(63) Continuation of application No. PCT/KR2021/017730, filed on Nov. 29, 2021.

(30) Foreign Application Priority Data

Jan. 29, 2021  (KR) .................. 10-2021-0013377

(51) Int. Cl.
*H04R 1/34* (2006.01)
*G06F 1/16* (2006.01)
*H04R 1/02* (2006.01)

(52) U.S. Cl.
CPC ........... *H04R 1/345* (2013.01); *G06F 1/1616* (2013.01); *G06F 1/1681* (2013.01); *H04R 1/028* (2013.01);

(Continued)

(58) Field of Classification Search
CPC ................ H04R 1/345; H04R 2499/11; H04R 2499/15; G06F 1/1616; G06F 1/1681

(Continued)

(56) References Cited

U.S. PATENT DOCUMENTS

| 6,850,780 B1 | 2/2005 | Gioscia et al. |
| 2013/0094686 A1 | 4/2013 | Shin et al. |

(Continued)

FOREIGN PATENT DOCUMENTS

| JP | 2005-033723 A | 2/2005 |
| JP | 2016-213671 A | 12/2016 |

(Continued)

OTHER PUBLICATIONS

Japanese Examination Report dated Oct. 22, 2024, issued in Japanese Patent Application No. 2023-545878.

(Continued)

*Primary Examiner* — Thjuan K Addy
(74) *Attorney, Agent, or Firm* — Jefferson IP Law, LLP

(57) ABSTRACT

An electronic device is provided. The electronic device includes an acoustic waveguide, a first support plate for defining at least a part of the acoustic waveguide at one surface thereof, a first display arranged on the one surface of the first support plate, a second display arranged on the other surface of the first support plate, and a speaker module arranged on the other surface of the first support plate between the first support plate and the second display, wherein the acoustic waveguide can be formed to radiate, from one side of the second display to an external space, a sound outputted from the speaker module.

20 Claims, 5 Drawing Sheets

(52) U.S. Cl.
CPC ...... *H04R 2499/11* (2013.01); *H04R 2499/15* (2013.01)

(58) Field of Classification Search
USPC .................. 381/333, 301, 306, 388, 332
See application file for complete search history.

(56) References Cited

U.S. PATENT DOCUMENTS

| | | | |
|---|---|---|---|
| 2014/0301578 A1 | 10/2014 | Lee | |
| 2015/0023531 A1 | 1/2015 | Horii et al. | |
| 2018/0035234 A1* | 2/2018 | Roach | G02B 27/017 |
| 2018/0077513 A1* | 3/2018 | Link | G02B 27/017 |
| 2018/0077793 A1 | 3/2018 | Qian | |
| 2018/0279029 A1 | 9/2018 | Saini et al. | |
| 2019/0098121 A1 | 3/2019 | Jeon et al. | |
| 2019/0369668 A1 | 12/2019 | Kim et al. | |
| 2020/0021674 A1 | 1/2020 | Cheng | |
| 2020/0169816 A1 | 5/2020 | Kim et al. | |
| 2020/0221587 A1 | 7/2020 | An | |
| 2020/0326900 A1 | 10/2020 | Kwon et al. | |
| 2020/0329132 A1 | 10/2020 | Jung et al. | |
| 2020/0350384 A1 | 11/2020 | Park et al. | |
| 2021/0006876 A1 | 1/2021 | Moon et al. | |
| 2022/0150610 A1 | 5/2022 | Kim et al. | |

FOREIGN PATENT DOCUMENTS

| | | | |
|---|---|---|---|
| JP | 6434656 B2 | 12/2018 | |
| JP | 2019-211778 A | 12/2019 | |
| KR | 10-2011-0090697 A | 8/2011 | |
| KR | 10-2014-0120715 A | 10/2014 | |
| KR | 10-2018-0020653 A | 2/2018 | |
| KR | 10-2018-0051983 A | 5/2018 | |
| KR | 10-1880465 B1 | 7/2018 | |
| KR | 10-2020-0060991 A | 6/2020 | |
| KR | 10-2020-0086505 A | 7/2020 | |
| KR | 10-2020-0100359 A | 8/2020 | |
| KR | 10-2020-0119003 A | 10/2020 | |
| KR | 10-2020-0119020 A | 10/2020 | |
| KR | 10-2020-0128286 A | 11/2020 | |
| RU | 2621478 C2 | 6/2017 | |

OTHER PUBLICATIONS

Australian Office Action dated Oct. 23, 2023, issued in Australia Patent Application No. 2021423596.
Korean Office Action dated Dec. 14, 2023, issued in Korean Patent Application No. 10-2021-0013377.
International Search Report dated Mar. 4, 2022, issued in International Patent Application No. PCT/KR2021/017730.
Korean Decision on Grant dated Apr. 24, 2024, issued in Korean Patent Application No. 10-2021-0013377.
Russian Office Action dated Feb. 19, 2024, issued in Russian Patent Application No. 2023122229.
Australian Examination Report dated Feb. 19, 2024, issued in Australian Patent Application No. 2021423596.
Extended European Search Report dated Apr. 19, 2024, issued in European Patent Application No. 21923402.8.
Russian Search Report dated Feb. 19, 2024, issued in Russian Patent Application No. 2023122229.

* cited by examiner

ELECTRONIC DEVICE COMPRISING SPEAKER MODULE

CROSS-REFERENCE TO RELATED APPLICATION(S)

This application is a continuation application, claiming priority under § 365(c), of an International application No. PCT/KR2021/017730, filed on Nov. 29, 2021, which is based on and claims the benefit of a Korean patent application number 10-2021-0013377, filed on Jan. 29, 2021, in the Korean Intellectual Property Office, the disclosure of which is incorporated by reference herein in its entirety.

BACKGROUND

1. Field

The disclosure relates to an electronic device. More particularly, the disclosure relates to an electronic device with a speaker module.

2. Description of Related Art

The growth of electronics, information, and communication technologies leads to integration of various functions into a single electronic device. For example, smartphones pack the functionalities of a sound player, imaging device, and scheduler, as well as the communication functionality and further various functions are implemented in the smartphones through additional installation of applications.

As the use of personal, portable electronic devices, such as smartphones, becomes more common, user demand for portability and ease of use are increasing. For example, the demand for multimedia services via broadcast or live streaming is growing rapidly, as well as voice calls in early wireless communications. In implementing electronic devices that are portable and suitable for multimedia services, competition for image and sound quality is intensifying. Flexible displays may be folded or rolled to make them more portable while providing a larger screen than the typical flat panel display.

The above information is presented as background information only to assist with an understanding of the disclosure. No determination has been made, and no assertion is made, as to whether any of the above might be applicable as prior art with regard to the disclosure.

SUMMARY

It may be difficult to secure sound quality in downsized electronic devices. For example, in downsized electronic device, it may be difficult to design and secure a path through which sound may be transferred or radiated from a speaker module to an external space. In such sound transmission paths, sound pressure may leak through the gaps between different structures, degrading the sound quality, or the leaked sound pressure may cause the internal structures to vibrate and generate noise.

Aspects of the disclosure are to address at least the above-mentioned problems and/or disadvantages and to provide at least the advantages described below. Accordingly, an aspect of the disclosure is to provide an electronic device capable of suppressing sound pressure leakage in a sound transmission path.

Another aspect of the disclosure is to provide an electronic device capable of suppressing or preventing noise generation due to leaked sound pressure.

Another aspect of the disclosure is to provide an electronic device including a stable layout structure of various components or structures while providing a sound transfer path.

Additional aspects will be set forth in part in the description which follows and, in part, will be apparent from the description, or may be learned by practice of the presented embodiments.

In accordance with an aspect of the disclosure, an electronic device is provided. The electronic device includes an acoustic waveguide, a first supporting plate configured to define at least a portion of the acoustic waveguide on one surface, a first display disposed on one surface of the first supporting plate, a second display disposed on another surface of the first supporting plate, and a speaker module disposed on the other surface of the first supporting plate between the first supporting plate and the second display. The acoustic waveguide may be configured to radiate sound output from the speaker module at one side of the second display to an external space.

In accordance with another aspect of the disclosure, an electronic device is provided. The electronic device includes a first housing and a second housing configured to pivot relative to each other between a first position where the first housing and the second housing are disposed to face each other and a second position where the first housing and the second housing are unfolded from each other at a designated angle from the first position, a hinge module disposed between the first housing and the second housing to rotatably connect the first housing and the second housing, and a first display including a first area disposed on the first housing, a second area disposed on the second housing and disposed to face the first area in the first position, and a folding area disposed corresponding to an area where the hinge module is disposed and connecting the first area and the second area. One of the first housing or the second housing may include an acoustic waveguide, a first supporting plate configured to define at least a portion of the acoustic waveguide and support either the first area or the second area, a second display disposed on another surface of the first supporting plate, and a speaker module disposed on the other surface of the first supporting plate between the first supporting plate and the second display. The acoustic waveguide may be configured to radiate the sound output from the speaker module at one side of the second display to an external space.

According to various embodiments of the disclosure, with a speaker module and a display (e.g., the second display 303 of FIG. 4) disposed on one surface of the first supporting plate, an acoustic waveguide may be provided in an area or space that is substantially isolated from the display, thereby preventing sound or sound pressure transmitted through the acoustic waveguide from interfering with the display. For example, an electronic device according to various embodiments prevents sound pressure from leaking from the sound transfer path, thereby suppressing or preventing the generation of noise and providing good sound quality. In an embodiment, as the display is disposed in an area or space that is separate from the sound transfer path (e.g., an acoustic waveguide), it is possible to enhance design freedom for the mounting structure of the display and to provide a stable display mounting structure. Other various effects may be provided directly or indirectly in the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
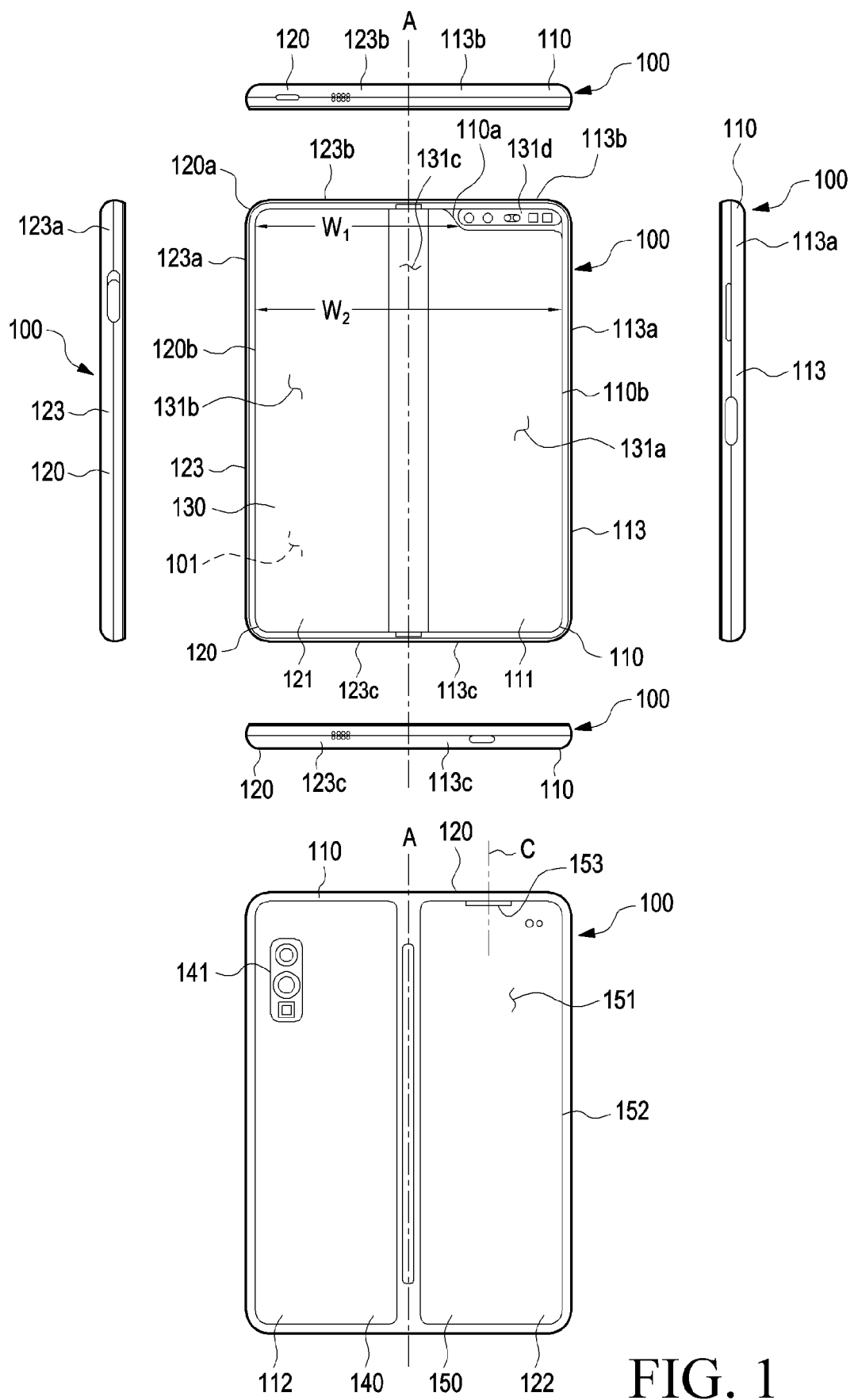
FIG. 1 is a view illustrating an unfolding state of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above or below.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module is implemented in the form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor of the machine (e.g., the electronic device) invokes at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a view illustrating an unfolding state of an electronic device according to an embodiment of the disclosure.

Figure 2:
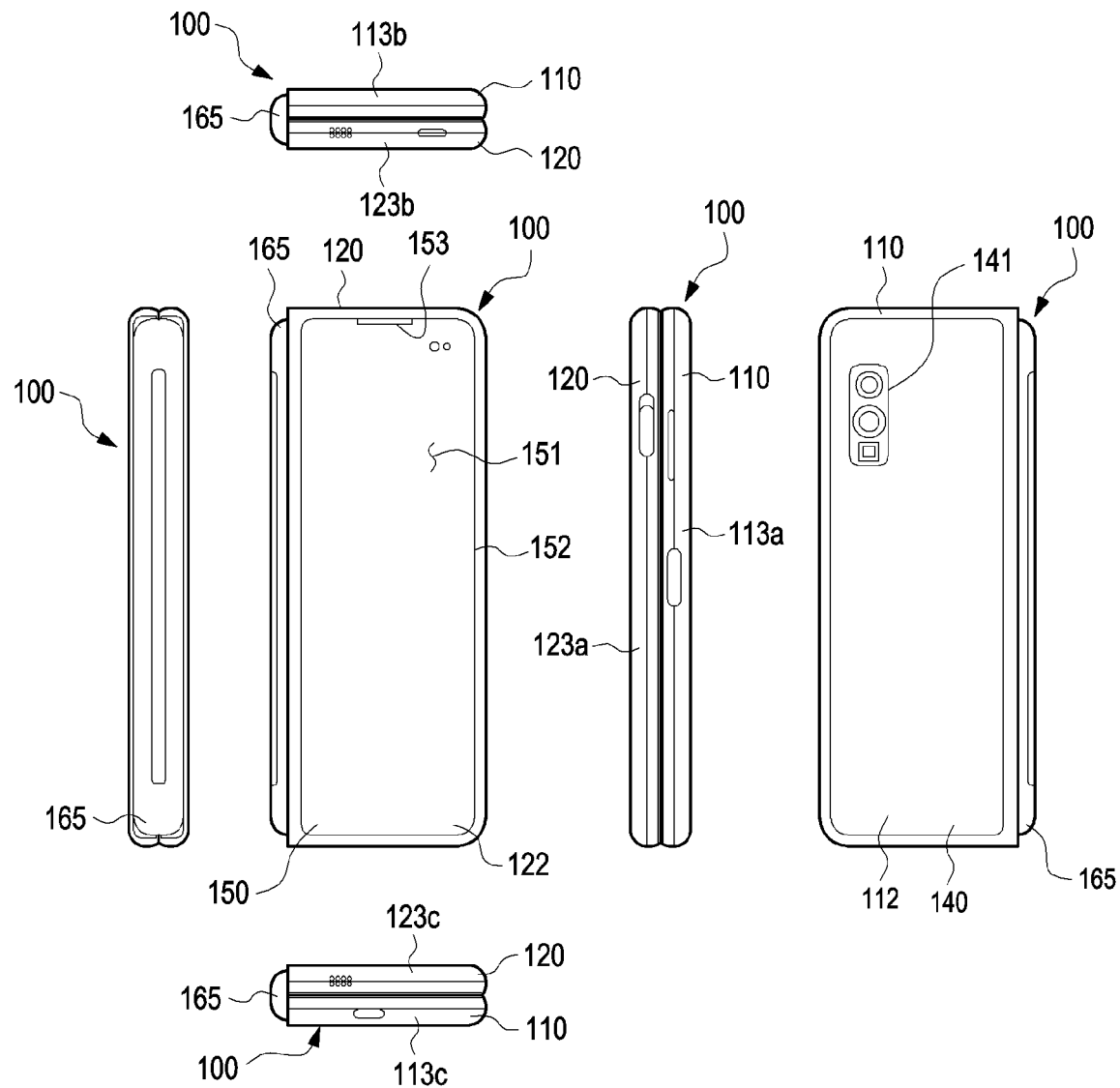
FIG. 2 is a view illustrating a folding state of the electronic device of FIG. 1 according to an embodiment of the disclosure.

FIG. 2 is a view illustrating a folding state of the electronic device of FIG. 1 according to an embodiment of the disclosure.

In the following detailed description, a configuration in which a pair of housing structures (or referred to as a 'housing') are coupled to be rotatable by a hinge structure (or referred to as a 'hinge module') is described as an example. However, it should be noted that the electronic device according to various embodiments of the disclosure is not limited thereto. For example, according to various embodiments, the electronic device includes three or more housing structures. In the embodiment disclosed below, a "pair of housing structures" may mean two rotatably-coupled housing structures among three or more housing structures.

Referring to FIG. 1, an electronic device 100 may include a pair of housing structures 110 and 120 rotatably coupled via a hinge structure (e.g., the hinge structure 164 of FIG. 3) to be folded relative to each other, a hinge cover 165 covering a foldable portion of the pair of housing structures 110 and 120, and a display 130 (e.g., a flexible display or foldable display) disposed in a space formed by the pair of housing structures 110 and 120. In an embodiment, the electronic device 100 may include a foldable housing in which a pair of housing structures 110 and 120 are rotatably coupled from a position in which they are folded facing each other to a position in which they are unfolded side-by-side relative to each other. As used herein, the surface on which the display 130 is disposed may be defined as a front surface of the electronic device 100, and the surface opposite to the front surface may be defined as a rear surface of the electronic device 100. The surface surrounding the space between the front and rear surfaces may be defined as a side surface of the electronic device 100.

In another embodiment, the pair of housing structures 110 and 120 may include a first housing structure (e.g., first housing) 110 including a sensor area 131d, a second housing structure (e.g., second housing) 120, a first rear cover 140, and a second rear cover 150. The pair of housing structures 110 and 120 of the electronic device 100 are not limited to the shape and coupling shown in FIGS. 1 and 2 but may rather be implemented in other shapes or via a combination and/or coupling of other components. For example, the first housing structure 110 and the first rear cover 140 are integrally formed with each other, and the second housing structure 120 and the second rear cover 150 may be integrally formed with each other. In another embodiment, the first housing structure 110 may include a first rear cover 140, and the second housing structure 120 may include a second rear cover 150.

According to yet another embodiment, the first housing structure 110 and the second housing structure 120 may be disposed on both sides of a first axis, e.g., the folding axis A, and may have an overall symmetrical shape with respect to the folding axis A. In yet another embodiment, the first housing structure 110 and the second housing structure 120 may rotate on the hinge structure 164 or the hinge cover 165 about different folding axes. For example, the first housing structure 110 and the second housing structure 120 each are rotatably coupled to the hinge structure 164 or the hinge cover 165, and may rotate about the folding axis A or about different folding axes, respectively, to rotate from the position of being folded facing each other to the position of being inclined with respect to each other or to the position of being unfolded side by side with respect to each other.

As used herein, "positioned side by side with respect to each other" or "extending side by side with respect to each other" may mean a state in which the two structures (e.g., the housings 110 and 120) are at least partially positioned next to each other, or at least their respective portions that are next to each other are disposed parallel to each other. In yet another embodiment, "disposed side by side with respect to each other" may mean that the two structures are positioned next to each other while facing in the same direction or directions parallel to each other. In the following detailed description, the expressions "side by side" and "parallel" may be used, but will be readily understood based on the shapes and arrangement of the structures with reference to the attached drawings.

According to yet another embodiment, the first housing structure 110 and the second housing structure 120 may form different angles or distances depending on whether the foldable electronic device 100 is in an unfolding state (extended state, flat state or open state), folding state, or intermediate state. According to yet another embodiment, the first housing structure 110 further includes the sensor area 131d where various sensors are disposed, unlike the second housing structure 120, but, in the remaining area, the first housing structure 110 may be symmetrical in shape with the second housing structure 120. In another embodiment, the sensor area 131d may additionally be disposed in, or replaced by, at least a partial area of the second housing structure 120.

In yet another embodiment, the first housing structure 110, in the unfolding state of the electronic device 100, may be connected to the hinge structure (e.g., hinge structure 164 of FIG. 3) and may include a first surface 111 disposed to face the front surface of the electronic device 100, a second surface 112 facing in a direction opposite to the first surface 111, and a first side member 113 surrounding at least a portion of a space between the first surface 111 and the second surface 112. In yet another embodiment, the first side member 113 may include a first side surface 113a disposed parallel to the folding axis A, a second side surface 113b extending in a direction perpendicular to the folding axis A from one end of the first side surface 113a, and a third side surface 113c extending in a direction perpendicular to the folding axis A from the other end of the first side surface 113a. In describing various embodiments of the disclosure, expressions such as "parallel" or "perpendicular" are used to describe the arrangement of the above-described side surfaces but, according to yet another embodiment, may also mean "partially parallel" or "partially perpendicular". In yet another embodiment, expressions, such as "parallel" or "perpendicularly" may mean including an inclined arrangement relationship in an angular range of 10 degrees or less.

In yet another embodiment, the second housing structure 120 may be connected to the hinge structure (e.g., hinge structure 164 of FIG. 3) and may include a third surface 121 disposed to face the front surface of the electronic device 100 in the unfolding state of the electronic device 100, a fourth surface 122 facing in a direction opposite to the third surface 121, and a second side member 123 surrounding at least a portion of a space between the third surface 121 and the fourth surface 122. In yet another embodiment, the second side member 123 may include a fourth side surface 123a disposed parallel to the folding axis A, a fifth side surface 123b extending in a direction perpendicular to the folding axis A from one end of the fourth side surface 123a, and a sixth side surface 123c extending in a direction perpendicular to the folding axis A from the other end of the fourth side surface 123a. In yet another embodiment, the third surface 121 may be disposed to face the first surface 111 in the folding state. In yet another embodiment, the second side member 123 may be made of substantially the same shape or material as the first side member 113, albeit with some differences in specific shape.

In yet another embodiment, the electronic device 100 may include a recess 101 formed to receive the display 130 through structural shape coupling of the first housing structure 110 and the second housing structure 120. The recess 101 may have substantially the same size as the display 130. In yet another embodiment, due to the sensor area 131d, the recess 101 may have two or more different widths in a direction perpendicular to the folding axis A. For example, the recess 101 has a first width W1 between a first portion 120a parallel to the folding axis A of the second housing structure 120 and a first portion 110a formed at an edge of the sensor area 131d of the first housing structure 110 and a second width W2 formed by a second portion 120b of the second housing structure 120 and a second portion 110b parallel to the folding axis A and not corresponding to the sensor area 131d of the first housing structure 110. In this case, the second width W2 may be longer than the first width W1. For example, the recess 101 is formed to have a first width W1 formed from the first portion 110a of the first housing structure 110 to the first portion 120a of the second housing structure 120 having mutually asymmetrical shapes and a second width W2 formed from the second portion 110b of the first housing structure 110 to the second portion 120b of the second housing structure 120 having mutually symmetrical shapes. In yet another embodiment, the first portion 110a and the second portion 110b of the first housing structure 110 may be formed to have different distances from the folding axis A. The width of the recess 101 is not limited to the shown example. According to various embodiments, the recess may have two or more widths due to the shape of the sensor area 131d or the asymmetric portions of the first housing structure 110 and the second housing structure 120.

According to yet another embodiment, at least a portion of the first housing structure 110 and the second housing structure 120 may be formed of a metal material or a non-metal material having a predetermined degree of rigidity to support the display 130. In another embodiment, at least a portion of the first housing structure 110 and the second housing structure 120 may include an electrically conductive material. When the first housing structure 110 and the second housing structure 120 include a conductive material, the electronic device 100 may transmit/receive radio waves using a portion of the conductive material of the first housing structure 110 and the second housing structure 120. For example, the processor or communication module of the electronic device 100 performs wireless communication by using portions of the first housing structure 110 and the second housing structure 120.

According to yet another embodiment, the sensor area 131d may be formed adjacent to a corner of the first housing structure 110 and to have a predetermined area. However, the placement, shape, or size of the sensor area 131d is not limited to those illustrated. For example, in another embodiment, the sensor area 131d is provided in a different corner of the first housing structure 110 or in any area between the top corner and the bottom corner. In yet another embodiment, the sensor area 131d may be disposed in at least a partial area of the second housing structure 120. In another embodiment, the sensor area 131d may be disposed to extend to the first housing structure 110 and the second housing structure 120. In yet another embodiment, the electronic device 100 may include components exposed to the front of the electronic device 100 through the sensor area 131d or through one or more openings provided in the sensor area 131d, and various functions may be performed through the components. Components disposed in the sensor area 131d may include at least one of, e.g., a front camera device, a proximity sensor, an illuminance sensor, an iris recognition sensor, an ultrasonic sensor, or an indicator.

In yet another embodiment, the first rear cover 140 may be disposed on the second surface 112 of the first housing structure 110 and may have a substantially rectangular periphery. In yet another embodiment, the periphery of the first rear cover 140 may be at least partially covered by the first housing structure 110. Similarly, the second rear cover 150 may be disposed on the fourth surface 122 of the second housing structure 120, and at least a portion of its periphery may be covered by the second housing structure 120.

According to various embodiments, the first rear cover 140 and the second rear cover 150 may be substantially symmetrical in shape with respect to the folding axis A. In another embodiment, the first rear cover 140 and the second rear cover 150 may include various shapes different from each other. According to another embodiment, the first rear cover 140 may be integrally formed with the first housing structure 110, and the second rear cover 150 may be integrally formed with the second housing structure 120.

According to yet another embodiment, the first rear cover 140, the second rear cover 150, the first housing structure 110, and the second housing structure 120 may provide a space where various components (e.g., a printed circuit board, antenna module, sensor module, or battery) of the electronic device 100 may be disposed, through the structure in which they are coupled together. According to yet another embodiment, one or more components may be arranged or visually exposed on/through the rear surface of the electronic device 100. For example, one or more components or sensors is visually exposed through a first rear area 141 of the first rear cover 140. According to various embodiments, the sensors may include at least one of a proximity sensor, a rear camera device, or a flash. According to another embodiment, a sub display 152 may be at least partially visually exposed through a second rear area 151 of the second rear cover 150. In yet another embodiment, the sub display 152 may be disposed on substantially the entire second rear area 151. According to an embodiment, the electronic device 100 may include a slit 153 provided in the second housing structure 120. The slit 153 may be configured to radiate sound to an external space, for example, and, in a voice call, may function as an acoustic hall to radiate the voice of the other party.

Referring to FIG. 2, when the sensor disposed in the first rear area 141 is a camera module, in the folded state, the camera module may be configured to capture the subject in a direction opposite to the direction in which the sub display 152 outputs the screen.

The display 130 may be disposed in a space formed by the pair of housing structures 110 and 120. For example, the display 130 is seated in a recess formed by the pair of housing structures 110 and 120 (e.g., the recess 101 in FIG. 1), and may be positioned to occupy a substantial majority of the front surface of the electronic device 100. For example, the front surface of the electronic device 100 includes a display 130 and a partial area (e.g., edge area) of the first housing structure 110 and a partial area (e.g., edge area) of the second housing structure 120 adjacent to the display 130. In yet another embodiment, the rear surface of the electronic device 100 may include a first rear cover 140, a partial area (e.g., an edge area) of the first housing structure 110 adjacent to the first rear cover 140, a second rear cover 150, and a partial area (e.g., an edge area) of the second housing structure 120 adjacent to the second rear cover 150.

In another embodiment, the display 130 may mean a display at least a portion of which may be transformed into a flat or curved surface. In yet another embodiment, the display 130 may include a folding area 131c, a first area 131a disposed on one side (e.g., a right-hand area of the folding area 131c) of the folding area 131c and a second area 131b disposed on the other side (e.g., a left-hand area of the folding area 131c) of the folding area 131c. For example, the first area 131a is disposed on the first surface 111 of the first housing structure 110. The second area 131b may be disposed on the third surface 121 of the second housing structure 120. For example, the display 130 extends from the first surface 111 to the third surface 121 through the hinge structure 164 of FIG. 3. At least an area (e.g., the folding area 131c) corresponding to the hinge structure 164 may be a flexible area deformable from a flat form to a curved form.

In yet another embodiment, the segmentation of the display 130 is merely an example, and the display 130 may be divided into a plurality of (e.g., four or more, or two) areas depending on the structure or function of the display 200. For example, in the embodiment shown in FIG. 1, the folding area 131c extends in the direction of the vertical axis (e.g., the Y axis of FIG. 3) parallel to the folding axis A. Although the display 130 may be divided into the areas by the folding area 131c or the folding axis A, in another embodiment, the display 130 may be divided by another folding area (e.g., a folding area parallel to the horizontal axis (e.g., the X axis of FIG. 3)) or another folding axis (e.g., a folding axis parallel to the X axis of FIG. 3). The above-described division into areas of the display is merely a physical division by the pair of housing structures 110 and 120 and the hinge structure (e.g., hinge structure 164 in FIG. 3), and the display 130 may display substantially one entire screen through the pair of housing structures 110 and 120 and the hinge structure (e.g., the hinge structure 164 of FIG. 3).

According to yet another embodiment, the first area 131a and the second area 131b may be overall symmetrical in shape with respect to the folding area 131c. However, the first area 131a, unlike the second area 131b, may include a notch area (e.g., the notch area 133 in FIG. 3) that provides a sensor area 131d and, other than that, may have a shape that is symmetrical to the second area 131b. For example, the first area 201 and the second area 202 include symmetrical portions and asymmetrical portions.

Figure 3:
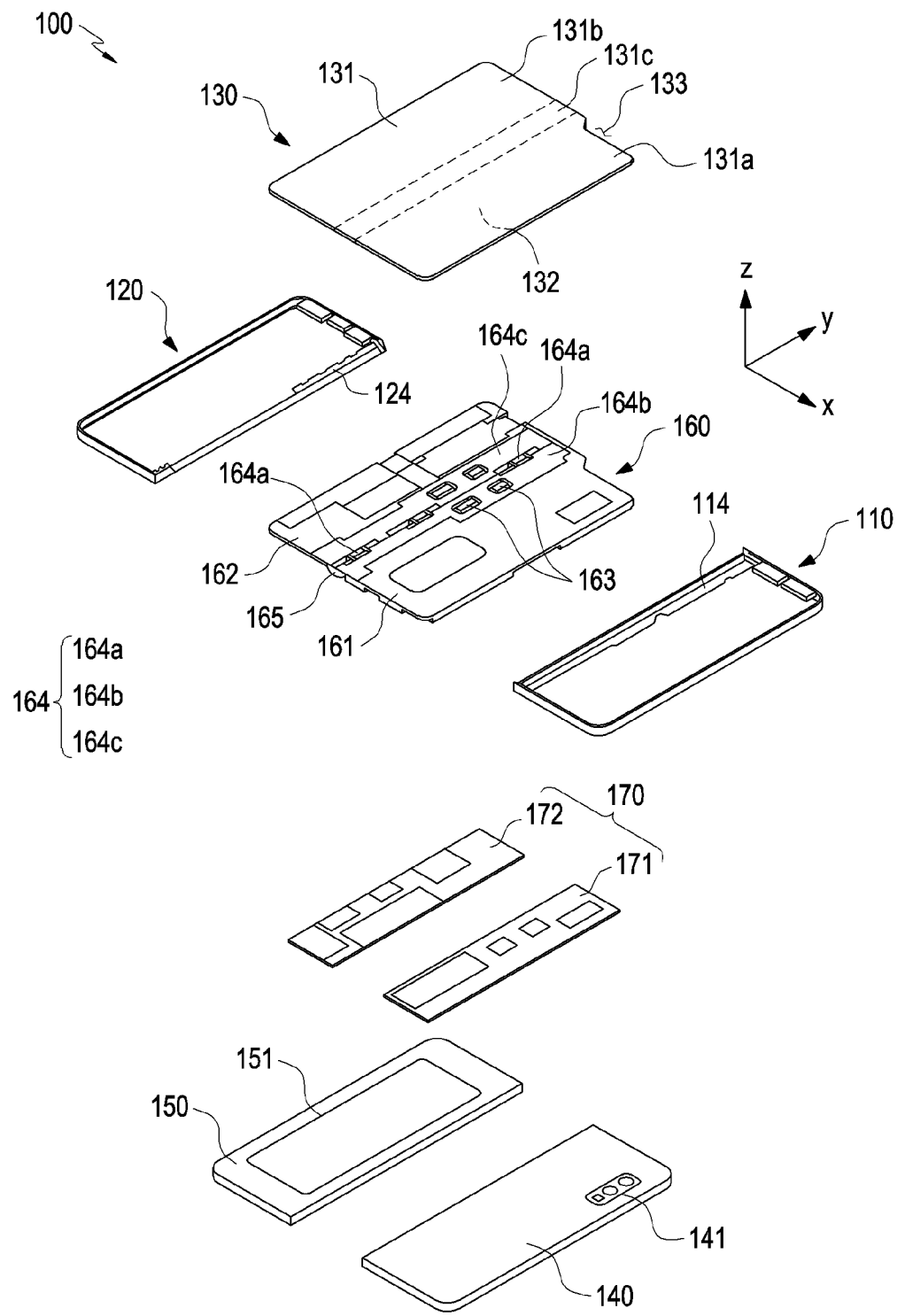
FIG. 3 is an exploded perspective view illustrating an electronic device according to an embodiment of the disclosure.

Further referring to FIG. 3, the hinge cover 165 may be disposed between the first housing structure 110 and the second housing structure 120 to hide the internal components (e.g., the hinge structure 164 of FIG. 3). In yet another embodiment, the hinge cover 165 may be hidden by a portion of the first housing structure 110 and second housing structure 120 or be exposed to the outside depending on the operation state (unfolded state (extended state) or folded state).

Described below are the operation of the first housing structure 110 and the second housing structure 120 and each area of the display 130 depending on the operation state (e.g., the unfolded state (flat state) and folded state) of the electronic device 100.

In yet another embodiment, when the electronic device 100 is in the unfolded state (extended state) (e.g., the state in FIG. 1), the first housing structure 110 and the second housing structure 120 form an angle of 180 degrees, and the first area 131a and the second area 131b of the display may be disposed to face in the same direction, e.g., to display the screen in directions parallel to each other. Further, the folding area 131c may form the same plane as the first area 131a and the second area 131b.

According to yet another embodiment, when the electronic device 100 is in the folded state (e.g., the state in FIG. 2), the first housing structure 110 and the second housing structure 120 may be disposed to face each other. For example, when the electronic device 100 is in the folded state (e.g., the state in FIG. 2), the first area 131a and the second area 131b of the display 130 face each other while forming a narrow angle (e.g., an angle between 0 and 10 degrees) therebetween. When the electronic device 100 is in the folded state (e.g., the state of FIG. 2), at least a portion of the folding area 131c may form a curved surface having a predetermined curvature.

In yet another embodiment, in the intermediate state of the electronic device 100, the first housing structure 110 and the second housing structure 120 may be arranged at a certain angle, e.g., 90 degrees or 120 degrees, therebetween. For example, in the intermediate state, the first area 131a and the second area 131b of the display 130 form an angle which is larger than the angle in the folded state and smaller than the angle in the unfolded state. The folding area 131c may at least partially have a curved surface with a predetermined curvature and, in this case, the curvature may be smaller than that when it is in the folded state.

FIG. 3 is an exploded perspective view illustrating an electronic device 100 according to an embodiment of the disclosure.

Referring to FIG. 3, in an embodiment, an electronic device 100 may include a display 130, a supporting member assembly 160, at least one printed circuit board 170, a first housing or first housing structure 110, a second housing or second housing structure 120, a first rear cover 140, and a second rear cover 150. In the disclosure, the display 130 may be referred to as a display module or display assembly.

The display 130 may include a display panel 131 (e.g., a flexible display panel) and one or more plates 132 or layers on which the display panel is seated. In another embodiment, the plate 132 may be disposed between the display panel 131 and the supporting member assembly 160. The display panel 131 may be disposed on at least a portion of one surface (e.g., the surface in the Z direction in FIG. 3) of the plate 132. The plate 132 may be formed in a shape corresponding to that of the display panel 131. For example, a partial area of the plate 132 is formed in a shape corresponding to the notch area 133 of the display panel 131.

The supporting member assembly 160 may include a first supporting member 161, a second supporting member 162, a hinge structure 164 disposed between the first supporting member 161 and the second supporting member 162, a hinge cover 165 covering the hinge structure 164 when the hinge structure 164 is viewed from the outside, and a wiring member 163 (e.g., a flexible printed circuit board (FPCB)) spanning the first supporting member 161 and the second supporting member 162.

In yet another embodiment, the supporting member assembly 160 may be disposed between the plate 132 and at least one printed circuit board 170. For example, the first supporting member 161 is disposed between the first area 131a of the display 130 and the first printed circuit board 171. The second supporting member 162 may be disposed between the second area 131b of the display 130 and the second printed circuit board 172.

In yet another embodiment, at least a portion of the wiring member 163 and the hinge structure 164 may be disposed inside the supporting member assembly 160. The wiring member 163 may be disposed in a direction (e.g., in the X-axis direction) across the first supporting member 161 and the second supporting member 162. The wiring member 163 may be disposed in a direction (e.g., in the X-axis direction) perpendicular to the folding axis (e.g., Y axis or folding axis A in FIG. 1) of the folding area 131c.

According to various embodiments, the hinge structure 164 may include at least one of a hinge module 164a, a first hinge plate 164b or a second hinge plate 164c. In yet another embodiment, the hinge module 164a may be interpreted as including the first hinge plate 164b and the second hinge plate 164c. In yet another embodiment, the first hinge plate 164b may be mounted inside the first housing structure 110, and the second hinge plate 164c may be mounted inside the second housing structure 120. In yet another embodiment, the first hinge plate 164b is mounted directly on the first supporting member 161. The second hinge plate 164c may be directly mounted on the second supporting member 162. In another embodiment, the first hinge plate 164b (or the second hinge plate 164c) may be mounted directly on another structure (e.g., the first rotation supporting surface 114 or the second rotation supporting surface 124) inside the first housing structure 110 (or the second housing structure 120). For example, the structure where the first hinge plate 164b (or second hinge plate 164c) is mounted inside the first housing structure 110 (or second housing structure 120) varies according to embodiments. In another embodiment, the hinge module 164a may be mounted to the first hinge plate 164b and second hinge plate 164c to rotatably connect the second hinge plate 164c to the first hinge plate 164b. For example, a folding axis (e.g., folding axis A in FIG. 1) is formed by the hinge module 164a, and the first housing structure 110 and the second housing structure 120 (or first supporting member 161 and second supporting member 162) may be rotated relative to each other substantially about the folding axis A.

The at least one printed circuit board 170 may include a first printed circuit board 171 disposed on the first supporting member 161 side and a second printed circuit board 172 disposed on the second supporting member 162 side, as described above. The first printed circuit board 171 and the second printed circuit board 172 may be disposed in a space formed by the supporting member assembly 160, the first housing structure 110, the second housing structure 120, the first rear cover 140, and the second rear cover 150. Components for implementing various functions of the electronic device 100 may be mounted on the first printed circuit board 171 and the second printed circuit board 172.

In yet another embodiment, the first housing structure 110 and the second housing structure 120 may be assembled together to be coupled to two opposite sides of the supporting member assembly 160, with the display 130 coupled to the supporting member assembly 160. The first housing structure 110 and the second housing structure 120 may be slidably coupled to two opposite sides of the supporting member assembly 160, for example, to the first support member 161 and the second support member 162, respectively. The first supporting member 161 and the second supporting member 162 are substantially received in the first housing structure 110 and the second housing structure 120, and according to yet another embodiment, may be interpreted as portions of the first housing structure 110 and the second housing structure 120.

In yet another embodiment, the first housing structure 110 may include a first rotation supporting surface 114, and the second housing structure 120 may include a second rotation supporting surface 124 corresponding to the first rotation supporting surface 114. The first rotation supporting surface 114 and the second rotation supporting surface 124 may include a curved surface corresponding to a curved surface included in the hinge cover 165.

In yet another embodiment, when the electronic device 100 is in an unfolded state (e.g., the state of FIG. 1), the first rotation supporting surface 114 and the second rotation supporting surface 124 may cover the hinge cover 165 to prevent or minimize exposure of the hinge cover 165 to the rear surface of the electronic device 100. In yet another embodiment, when the electronic device 100 is in a folded state (e.g., the state of FIG. 2), the first rotation supporting surface 114 and the second rotation supporting surface 124 may rotate along a curved surface included in the hinge cover 165 to maximize exposure of the hinge cover 165 to the rear surface of the electronic device 100.

In the following detailed description, ordinal numerals have been used to simply distinguish the components, such as the first housing structure 110, second housing structure 120, first side member 113, or second side member 123, but it should be noted that the disclosure is not limited by these ordinal numerals. For example, although the sensor area 131d is illustrated as being formed in the first housing structure 110, the sensor area 131d is formed in the second housing structure 120 or in both the first and second housing structures 110 and 120. In another embodiment, a configuration in which the first rear area 141 is disposed on the first rear cover 140 and the sub display 152 is disposed on the second rear cover 150 is exemplified. However, the first rear area 141 for disposing, e.g., the sensor, and the sub display 152 for outputting screen, both, may be disposed on either the first rear cover 140 or the second rear cover 150.

Figure 4:
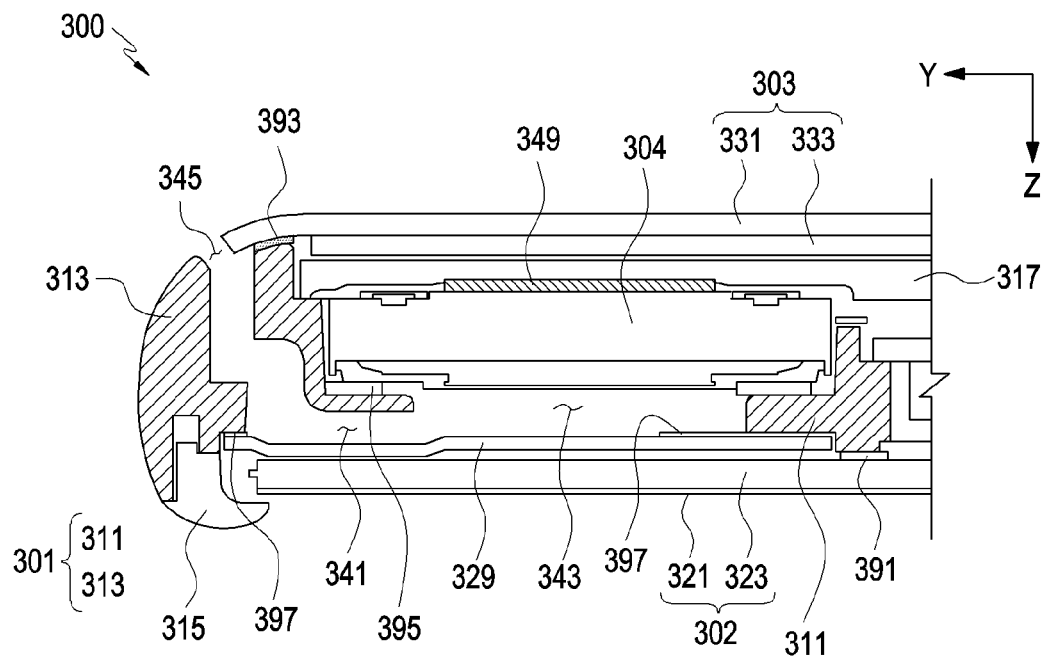
FIG. 4 is a cross-sectional view illustrating an electronic device according to an embodiment of the disclosure.

FIG. 4 is a cross-sectional view illustrating an electronic device 300 (e.g., the electronic device 100 or housings 110 and 120 of FIGS. 1 to 3) according to an embodiment of the disclosure.

Figure 5:
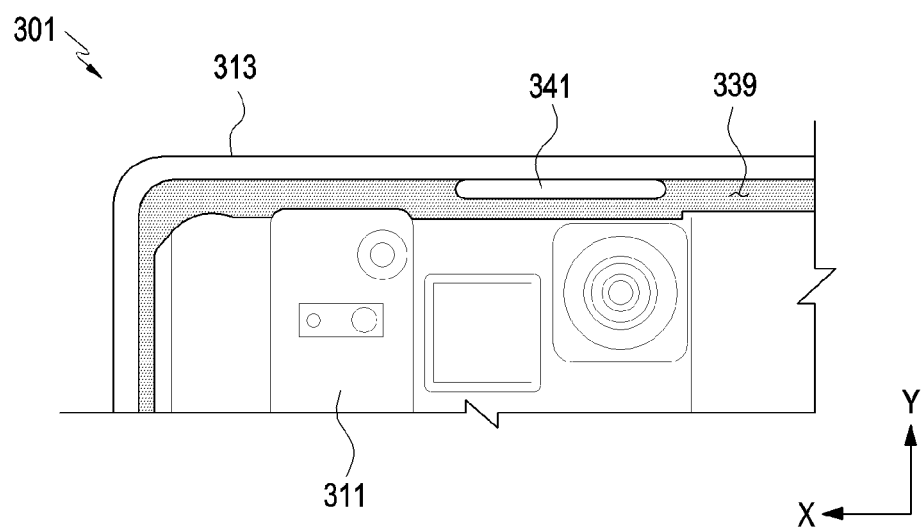
FIG. 5 is an enlarged, plan view illustrating a portion of a rear surface of a housing of an electronic device according to an embodiment of the disclosure.

FIG. 5 is an enlarged, plan view illustrating a portion of a rear surface of a housing 301 (e.g., the housing structures 110 and 120 of FIGS. 1 to 3) of an electronic device 300 according to an embodiment of the disclosure.

The electronic device 300 according to the embodiment disclosed in FIGS. 4 and 5 may be either the first housing or second housing (e.g., the first housing structure 110 or the second housing structure 120) of FIGS. 1 to 3. In an embodiment, the first housing structure 110 of FIGS. 1 to 3 may include at least one of the configuration of the electronic device 300 disclosed in FIG. 4, or the second housing structure 120 of FIGS. 1 to 3 may include the configuration of the electronic device 300 disclosed in FIG. 4. In another embodiment, the electronic device 300 of FIG. 4 may be interpreted as having the portion of the second housing structure 120 taken along line C of FIG. 1.

Referring to FIGS. 4 and 5, the electronic device 300 may include a housing 301, a first display 302 (e.g., the display 130 of FIG. 1 or 3) disposed on a front surface of the housing 301, a second display 303 (e.g., the sub display 152 of FIG. 1 or 2) disposed on a rear surface of the housing, and/or a speaker module 304 disposed between the first display 302 and the second display 303. In another embodiment, the electronic device 300 may include a plurality of speaker modules. At least one of the plurality of speaker modules may function as a loudspeaker that outputs sound in a multimedia mode for playing video or music, and at least one other (e.g., the speaker module 304) of the plurality of speaker modules may selectively function as a receiver speaker that outputs the receiving sound in voice call mode. In another embodiment, any one of the plurality of speaker modules may function as one of a loudspeaker and a receiver speaker according to the operation mode of the electronic device 300.

According to various embodiments, the speaker module 304 may output sound in a direction toward the first display 302. The output sound proceeds through an acoustic waveguide 341 provided in the inner space of the housing 301 and be radiated from one side of the second display 303 to an external space. Here, at least one of a space surrounded by the housing 301, the first display 302, or the second display 303 may be defined as 'the inner space of the electronic device 300 and/or the housing 301'. The 'external space' may mean 'a space around the electronic device 300 and/or the housing 301'. In yet another embodiment, the speaker module 304 may be provided as a receiver speaker that outputs the receiving sound in the voice call mode. According to another embodiment, in multimedia mode, the speaker module 304 may function as a loudspeaker and, in combination with another speaker module not shown, implement stereo sound.

According to various embodiments, the direction in which sound is radiated to the external space may be different from the direction in which the speaker module 304 outputs sound. In yet another embodiment, the direction in which sound is radiated to the external space may be substantially opposite to the direction in which the speaker module 304 outputs sound and may be the same as the direction in which the second display 303 outputs the screen. For example, when the direction in which the speaker module 304 outputs sound is defined as the '+Z direction', the sound is radiated to the external space along the −Z direction. In another embodiment, the sound is radiated substantially in the −Z direction and may thus be radiated in an inclined direction with respect to the Z axis. For example, the direction in which the acoustic waveguide 341 (e.g., the slits 153 and 345 of FIG. 1, 2 or 4) is directed may be defined by the designed shape of the electronic device 300, but the direction in which the sound propagates to the external space may be defined as various directions. In yet another embodiment, when the camera module is disposed in the first rear area 141 of FIG. 1 or 2, the camera module may be configured to capture the subject in a direction opposite to, or inclined from, the direction in which sound is radiated through the acoustic waveguide 341 or slit 345 to the external space.

According to various embodiments, the electronic device 300 includes a first supporting plate 311 (e.g., any of the supporting members 161 and 162 of FIG. 3) disposed between the first display 302 and the speaker module 304, and the acoustic waveguide 341 may be provided between the first display 302 and the first supporting plate 311. For example, the first supporting plate 311 defines at least a portion of the acoustic waveguide 341 on one surface (e.g., the surface facing the first display 302). In yet another embodiment, the speaker module 304 may be disposed between the first supporting plate 311 and the second display 303 and provide sound to the acoustic waveguide 341 through the first supporting plate 311. For example, the acoustic waveguide 341 is isolated from the space where the speaker module 304 (or the second display 303) is disposed, by the first supporting plate 311.

According to various embodiments, the housing 301 may include the first supporting plate 311 and a side bezel structure 313. In yet another embodiment, 'housing 301' may refer to a structure that receives other mechanical structures (e.g., at least a portion of supporting member assembly 160 of FIG. 3) or electrical components (e.g., the printed circuit board 170 of FIG. 3), in which case the first display 302 or second display 303 may be interpreted as part of the housing 301. In another embodiment, the side bezel structure 313 may be interpreted as part of the first supporting plate 311. According to yet another embodiment, the first supporting plate 311 may be disposed substantially inside the electronic device 300 (e.g., at least one of the housing structures 110 and 120 of FIGS. 1 to 3), and be connected to the side bezel structure 313 or integrally formed with the side bezel structure 313. The first supporting plate 311 may be formed of, e.g., a metal and/or non-metallic material (e.g., polymer). The first display 302 may be coupled to one surface of the first supporting plate 311, and the speaker module 304 and/or the printed circuit board (e.g., the printed circuit board 170 of FIG. 3) may be disposed between the other surface of the first supporting plate 311 and the second display 303.

According to various embodiments, the side bezel structure 313 may have a frame shape substantially enclosing a space between the first display 302 and the second display 303. In yet another embodiment, the side bezel structure 313 may be formed of substantially the same material as the first supporting plate 311. In another embodiment, the side bezel structure 313 may at least partially include an electrically conductive material, and the portion formed of the electrically conductive material may function as a radiation conductor for transmitting and receiving radio signals. In yet another embodiment, the side bezel structure 313 may be disposed at least partially adjacent to an edge of the first display 302 or the second display 303.

According to various embodiments, various electric/electronic components, such as a processor, memory, and/or interface, may be disposed on the printed circuit board 170. The processor may include one or more of, e.g., a central processing unit, an application processor, a graphic processing device, an image signal processing, a sensor hub processor, or a communication processor. In an embodiment, the processor or communication module may be mounted in the electronic component, such as an integrated circuit chip, and disposed on the printed circuit board 170.

According to various embodiments, the first display 302 may be disposed on one surface of the first supporting plate 311 while being at least partially surrounded by the side bezel structure 313. The acoustic waveguide 341 may be disposed or formed at least partially in a space between the first display 302 and the first supporting plate 311. The acoustic waveguide 341 may be substantially defined as a space provided by the first supporting plate 311, and a portion of the acoustic waveguide 341 may be defined by the first display 302 (or the dummy plate 329 described below). In another embodiment, another portion of the acoustic waveguide 341 may be defined by the side bezel structure 313.

According to various embodiments, the first display 302 may include a first display panel 323 (e.g., the display panel 131 of FIG. 3) attached to the first supporting plate 311 by a first adhesive member 391. The first adhesive member 391 may be, e.g., a double-sided tape having elasticity. In yet another embodiment, the first display 302 may protect the first display panel 323 from the external environment by including a protective sheet 321 exposed to the external space. The protective sheet 321 may be formed of, e.g., a synthetic resin film or thin glass, and be substantially transparent to transmit the screen output from the first display panel 323. For example, when the electronic device 300 is provided as at least one of the housings of FIGS. 1 to 3 (e.g., the first housing structure 110 and the second housing 120), the first display 302 is folded or rolled by including the folding area 131c.

According to various embodiments, the electronic device 300 may further include a decoration member 315 mounted to the side bezel structure 313. The decoration member 315 may be disposed to surround an edge of the first display 302 on the front surface of the electronic device 300. For example, the decoration member 315 provides a decorative effect on the exterior of the electronic device 300 while protecting the edge of the first display 302.

According to various embodiments, the second display 303 may be disposed on the other surface of the first supporting plate 311 and at least partially surrounded by the side bezel structure 313 and, along with at least a portion of the housing 301 (e.g., the side bezel structure 313), define or form a slit 345 (e.g., the slit 153 in FIG. 1 or 2). For example, a portion of the side bezel structure 313 is disposed adjacent to an edge of the second display 303, and the slit 345 is formed substantially by the gap between the side bezel structure 313 and the second display 303.

According to various embodiments, the second display 303 may include a transparent plate 331 exposed to an external space and a second display panel 333 disposed on an inner surface of the transparent plate 331. For example, the transparent plate 331 may be coupled to at least one of the first supporting plate 311 or the side bezel structure 313 by the second adhesive member 393. The second display panel 333 may be disposed between the transparent plate 331 and the first supporting plate 311. The transparent plate 331 may be formed of a glass plate or a polymer plate including various coating layers and, as it is substantially transparent, the transparent plate 331 may transmit the screen output through the second display panel 333.

According to various embodiments, the second display 303 may extend substantially from the first display 302, wrapping around a portion of the side surfaces of the electronic device 300 and/or housing 301 (e.g., side surfaces 13a, 113b, 113c, 123a, 123b, and 123c of FIG. 1 or 2) while being disposed on the rear surface of the electronic device 300 and/or housing 301. When the second display 303 extends from the first display 302, the transparent plate 331 may be formed to have substantially the same material or thickness as the protective sheet 321. In another embodiment, in a structure in which the second display 303 extends from the first display 302, the portion of the transparent plate 331, disposed on the side surface of the electronic device 300 and/or housing 301 or on the rear surface of the electronic device and/or housing, may differ in thickness from the protective sheet 321.

According to various embodiments, the electronic device 300 may further include a second supporting plate 317. The second supporting plate 317 may be disposed in a space between the speaker module 304 and the second display 303 and be configured to substantially support the second display 303 (e.g., the second display panel 333). For example, the entire area of the second display panel 333 is supported by the second supporting plate 317, keeping it stably in the flat plate shape. In yet another embodiment, the electronic device 300 may further include an elastic member 349 disposed between the second supporting plate 317 and the speaker module 304. The elastic member 349 may pressurize the speaker module 304 and bring it into tight contact with the first supporting plate 311.

According to various embodiments, the speaker module 304 may be provided on the other surface of the first supporting plate 311, and the area in contact with the first supporting plate 311 may be substantially sealed. For example, an elastic third adhesive member 395 (e.g., double-sided tape) is provided in the area where the speaker module 304 and the first supporting plate 311 contact each other. The speaker module 304 may be brought in tight contact with the third adhesive member 395 and/or the first supporting plate 311 by the elastic force of the elastic member 349. The speaker module 304 may output sound in a direction (e.g., +Z direction) toward the first display 302. The output sound may propagate through the acoustic waveguide 341 and be radiated to an external space.

According to various embodiments, the acoustic waveguide 341 may be configured to receive the sound output from the speaker module 304 and radiate it to an external space. According to yet another embodiment, the acoustic waveguide 341 may substantially have a recess shape formed by machining one surface of the first supporting plate 311 and may be connected to the external space in a position adjacent to the edge of the first supporting plate 311. In yet another embodiment, the acoustic waveguide 341 may pass through a portion of the side bezel structure 313 and be connected to the external space through the slit 345. For example, at least a portion of the acoustic waveguide 341 refers to a space surrounded by the first supporting plate 311 and/or the side bezel structure 313.

According to various embodiments, a partial area of the acoustic waveguide 341 facing the first display 302 may be open. The partial open area of the acoustic waveguide 341 may be closed by the first display 302 and/or the dummy plate 329. For example, another portion of the acoustic waveguide 341 is defined by at least one of the first display 302 or the dummy plate 329. In the illustrated embodiment, the electronic device 300 may further include a dummy plate 329, which may be disposed or attached to the first supporting plate 311 while surrounding another portion of the acoustic waveguide 341. The dummy plate 329 may be bonded to the first supporting plate 311 by a fourth adhesive member 397, such as adhesive or elastic double-sided tape. In yet another embodiment, the dummy plate 329 may be bonded to the first supporting plate 311 in a manner such as welding or fusion.

According to various embodiments, the first supporting plate 311 may include an opening area 343 formed through two opposite surfaces thereof. The opening area 343 may be formed in a position substantially corresponding to the speaker module 304, and the speaker module 304 may provide sound to the acoustic waveguide 341 through the opening area 343. The sound provided by the acoustic waveguide 341 may be radiated to the external space through the slit 345 by sequentially propagating through the acoustic waveguide 341, for example, the space partially surrounded by the dummy plate 329, and the space partially formed by the side bezel structure 313. For example, the acoustic waveguide 341 is configured to receive sound through the opening area 343 at one end and radiate sound through the slit 345 at the other end to the external space.

As mentioned above, in the sound transfer or propagation path from the speaker module 304 to the external space (e.g., the path provided by the acoustic waveguide 341), sound pressure may leak through the gap between the structures. For example, around acoustic waveguide 341, sound pressure may leak out if gaps exist between the speaker module 304 and first supporting plate 311, between the first supporting plate 311 and dummy plate 329, and/or between the first supporting plate 311 (or side bezel structure 313) and second display 303 (e.g., transparent plate 331). Sound pressure leakage through gaps between structures rather than through the designated path (e.g., slits) may result in distorted sound output that is not in accordance with the specifications or tuning of the speaker module 304. In another embodiment, if the leaking sound pressure enters the space between the structures (e.g., the space between the first supporting plate 311 and the second display 303), vibrations may occur in portions of the structures, which may be a source of noise.

According to various embodiments of the disclosure, sound pressure may be prevented from leaking through gaps in the interior of the electronic device 300 other than the designated path. For example, the third adhesive member 395 blocks leakage of sound pressure by providing a sealing structure between the speaker module 304 and the first supporting plate 311. The third adhesive member 395 may have a closed loop shape that wraps around the perimeter of the opening area 343 on the other surface of the first supporting plate 311. Similarly, the dummy plate 329 and the first supporting plate 311 may be bonded by the fourth adhesive member 397 and/or by welding or fusion, whereby a sealing structure may be formed between the dummy plate 329 and the first supporting plate 311 to prevent sound pressure from leaking. In yet another embodiment, around an end (e.g., slit 345) of the acoustic waveguide 341, the transparent plate 331 may be bonded to the first supporting plate 311 and/or side bezel structure 313 by the second adhesive member 393. For example, the second adhesive member 393 blocks sound pressure from entering the space between the transparent plate 331 and the first supporting plate 311 (or side bezel structure 313). For example, the bonding area (e.g., bonding area 339 in FIG. 5) in which the second adhesive member 393 is disposed is positioned substantially around the acoustic waveguide 341 (or slit 345) when viewed in the Z-axis direction, and the second adhesive member 393 may seal the gap between the transparent plate 331 and the first support plate 311 (or side bezel structure 313) around the acoustic waveguide 341.

According to various embodiments, when viewed in the Z-axis direction, the transparent plate 331 may be disposed to partially overlap the acoustic waveguide 341. For example, the edge of the transparent plate 331 may be at least partially colored not to transmit light, and the shape in which the acoustic waveguide 341 is machined is concealed by the colored portion of the transparent plate 331. Accordingly, the slit 345 may be defined by the first supporting plate 311 or the side bezel structure 313 and the second display 303 (e.g., the transparent plate 331). In yet another embodiment, although described as separate ones for convenience of description, the opening area 343 or slit 345 may be substantially part of the acoustic waveguide 341, and the transparent plate 331 may define another portion of the acoustic waveguide 341.

According to various embodiments, the second adhesive member 393 may be disposed to form a substantially closed loop along the edge of the second display 303. In another embodiment, the second display panel 333 may be disposed in an area surrounded by the second adhesive member 393. For example, the space surrounded by the second display 303 and the housing 301 (e.g., the first supporting plate 311 or the side bezel structure 313) is sealed against other spaces within the electronic device 300 or against the external space by the second adhesive member 393.

According to various embodiments, between the second display 303 and the first supporting plate 311, the second supporting plate 317 may isolate the space where the second display panel 333 is disposed from the space where the speaker module 304 is disposed or from the space where the printed circuit board 170 of FIG. 3 is disposed. For example, the second supporting plate 317 prevents the second display panel 333 from interfering with other structures within the interior of the electronic device 300, and supports substantially the entire area of the second display panel 333. As such, the placement structure of the acoustic waveguide 341 and/or the placement structure of the second display 303 may protect the second display panel 333 against other structures and keep it in stable placement while preventing sound pressure from entering the space between at least the first supporting plate 311 (or side bezel structure 313) and the second display 303.

Figure 6:
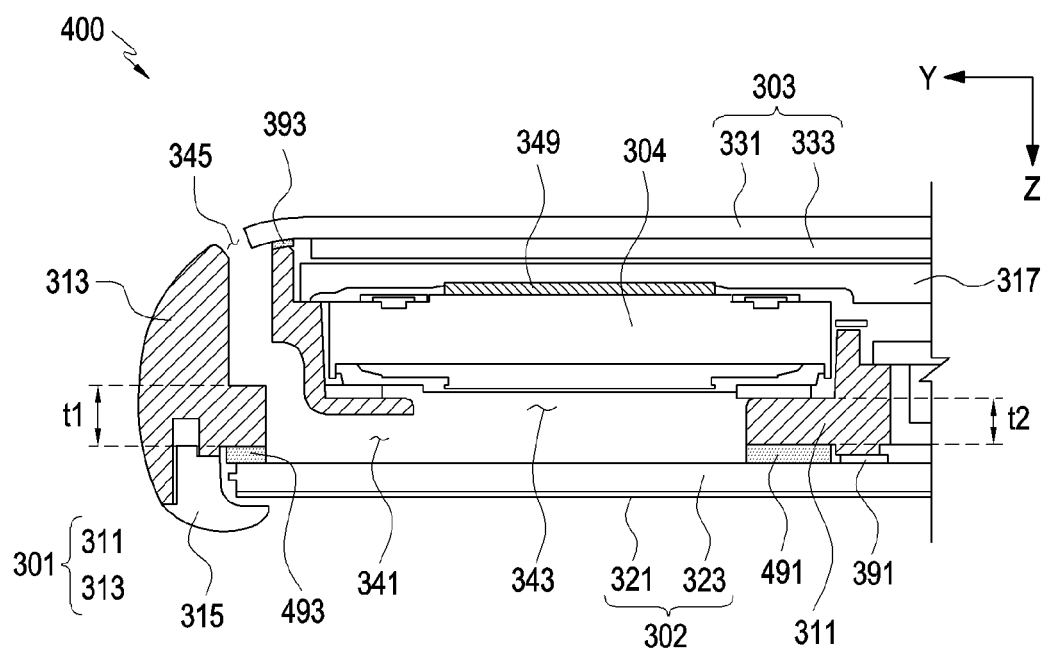
FIG. 6 is a cross-sectional view illustrating an electronic device according to an embodiment of the disclosure.

FIG. 6 is a cross-sectional view illustrating an electronic device (e.g., the electronic device 100 or 300 of FIGS. 1 to 4) according to an embodiment of the disclosure.

Referring to FIG. 6, it may be configured to omit the dummy plate 329 of the embodiment shown in FIG. 4 and define a portion of the acoustic waveguide 341 as the first display 302 itself. As compared to the embodiment shown in FIG. 4, in the electronic device 400 of FIG. 6, the thicknesses T1 and T2 of the first support plate 311 may be partially increased as the dummy plate 329 is omitted. For example, as compared to the electronic device 300 of FIG. 4, in the electronic device 400 of FIG. 6, as the thickness of the first supporting plate 311 is at least partially increased, the mechanical strength of the electronic device 400 is enhanced. In the following description, the components easy to understand from the description of the above-described embodiments are denoted with or without the same reference numerals and their detailed description may be skipped.

According to various embodiments, an electronic device 400 may further include at least one fifth adhesive member 491 and 493 that attaches the first display 302 (e.g., the first display panel 323) to the first supporting plate 311. The fifth adhesive member(s) 491 and 493 may be formed or disposed to form a closed loop that surrounds the open portion of the acoustic waveguide 341 in one surface of the first supporting plate 311. In an embodiment, the fifth adhesive member(s) 491 and 493 may be fabricated substantially as a single body (or "1-piece") with the first adhesive member 391. For example, while this embodiment illustrates the fifth adhesive members 491 and 493 that are separate from the first adhesive member 391, the first adhesive member 391 itself functions as the fifth adhesive member 491 or 493.

According to various embodiments, the first display 302 (e.g., the first display panel 323) may have sufficient rigidity to be prevented from being deformed by the sound pressure of the sound output from the speaker module 304, and may be disposed to define a portion of the acoustic waveguide 341 between the opening area 343 and the slit 345, replacing the dummy plate 329 of FIG. 4. In another embodiment, the first display panel 323 may be attached to the first supporting plate 311 by the fifth adhesive members 491 and 493 (and/or the first adhesive member 391), and in the area surrounded by the fifth adhesive members 491 and 493, the first display panel 323 may form a portion of the inner wall of the acoustic waveguide 341. According to yet another embodiment, the fifth adhesive members 491 and 493 may form a closed loop that substantially surrounds the open portion of the acoustic waveguide 341 in one surface of the first support plate 311. For example, the fifth adhesive members 491 and 493 form a sealing structure between the first supporting plate 311 and the first display 302 (e.g., the first display panel 323), thereby preventing sound pressure from leaking.

As described above, according to various embodiments of the disclosure, an electronic device (e.g., the electronic device 100, 300, or 400 of FIGS. 1 to 4 or 6) may comprise an acoustic waveguide (e.g., the acoustic waveguide 341 of FIG. 4 or 6), a first supporting plate (e.g., the supporting plates 161 and 162 of FIG. 3 or the housing 301 or the first supporting plate 311 of FIGS. 4 and 6) configured to define at least a portion of the acoustic waveguide on one surface, a first display (e.g., the display 130 of FIGS. 1 and 3 or the first display 302 of FIGS. 4 and 6) disposed on one surface of the first supporting plate, a second display (e.g., the sub display 152 of FIGS. 1 and 2 or the second display 303 of FIGS. 4 and 6) disposed on another surface of the first supporting plate, and a speaker module (e.g., the speaker module 304 of FIGS. 4 and 6) disposed on the other surface of the first supporting plate between the first supporting plate and the second display. The acoustic waveguide may be configured to radiate the sound output from the speaker module at one side of the second display to an external space.

According to various embodiments, the acoustic waveguide may be configured to radiate the sound to the external space in a direction (e.g., the −Z direction of FIGS. 4 and 6) opposite to, or a direction inclined from, a direction (e.g., the +Z direction of FIGS. 4 and 6) in which the speaker module outputs the sound.

According to various embodiments, the first supporting plate may include a side bezel structure (e.g., the side surfaces 113*a*, 113*b*, 113*c*, 123*a*, 123*b*, and 123*c* of FIGS. 1 and 2 or the side bezel structure 313 of FIGS. 4 and 6) disposed to at least partially surround a space between the first display and the second display. The side bezel structure may be at least partially disposed adjacent to an edge of the first display or the second display and be configured to define another portion of the acoustic waveguide.

According to various embodiments, the electronic device may further comprise an opening area (e.g., the opening area 343 of FIGS. 4 and 6) formed through the first supporting plate and a slit (e.g., the slits 153 and 345 of FIGS. 1, 2, and/or 4 and 6) formed adjacent to an edge of the first supporting plate. The acoustic waveguide may be configured to receive the sound output from the speaker module through the opening area and radiate sound to the external space through the slit.

According to various embodiments, the first display (e.g., the first display 302 of FIG. 6) may be attached to the first supporting plate and be configured to define another portion of the acoustic waveguide between the opening area and the slit.

According to various embodiments, the electronic device may further comprise a dummy plate (e.g., the dummy plate 329 of FIG. 4) disposed on one surface of the first supporting plate. The dummy plate may be configured to support a portion of the first display (e.g., the first display 302 of FIG. 4) while defining another portion of the acoustic waveguide between the opening area and the slit.

According to various embodiments, the electronic device may further comprise a side bezel structure disposed to at least partially surround a space between the first display and the second display, a second supporting plate (e.g., the second supporting plate 317 of FIGS. 4 and 6) disposed in the space between the speaker module and the second display and a slit formed between a portion of the second display and a portion of the side bezel structure. The acoustic waveguide may be configured to be connected to the external space through the slit.

According to various embodiments, the second display may include a transparent plate (e.g., the transparent plate 331 of FIGS. 4 and 6) having a portion which is disposed to, along with a portion of the side bezel structure, define the slit and a display panel (e.g., the second display panel 333 of FIGS. 4 and 6) provided on an inner surface of the transparent plate and disposed between the transparent plate and the second supporting plate.

According to various embodiments, the display panel may be attached to the second supporting plate.

According to various embodiments, the electronic device may further comprise an elastic member (e.g., the elastic member 349 of FIGS. 4 and 6) disposed between the second supporting plate and the speaker module. The elastic member may be configured to bring the speaker module into tight contact with the first supporting plate.

According to various embodiments, the electronic device may further comprise a side bezel structure disposed to at least partially surround a space between the first display and the second display, an opening area formed through the first supporting plate, and a slit formed between a portion of the second display and a portion of the side bezel structure. The acoustic waveguide may be configured to receive the sound output from the speaker module through the opening area and radiate sound to the external space through the slit.

According to various embodiments of the disclosure, an electronic device (e.g., the electronic device 100, 300, or 400 of FIGS. 1 to 4 or 6) may comprise a first housing and a second housing (e.g., the housing structures 110 and 120 of FIGS. 1 to 3 or the housing 301 of FIGS. 4 and 6) configured to pivot relative to each other between a first position (e.g., the state shown in FIG. 2) where the first housing and the second housing are disposed to face each other and a second position (e.g., the state shown in FIG. 1) where the first housing and the second housing are unfolded from each other at a designated angle from the first position, a hinge module (e.g., the hinge structure 164 of FIG. 3) disposed between the first housing and the second housing to rotatably connect the first housing and the second housing, and a first display (e.g., the display 130 of FIGS. 1 and 3 or the first display 302 of FIGS. 4 and 6) including a first area (e.g., the first area 131*a* of FIGS. 1 and 3) disposed on the first housing, a second area (e.g., the second area 131*b* of FIGS. 1 and 3) disposed on the second housing and disposed to face the first area in the first position, and a folding area (e.g., the folding area 131*c* of FIGS. 1 and 3) disposed corresponding to an area where the hinge module is disposed and connecting the first area and the second area. One the first housing or the second housing may include an acoustic waveguide (e.g., the acoustic waveguide 341 of FIG. 4 or 6), a first supporting plate (e.g., the supporting members 161 and 162 of FIG. 3 or the housing 301 or first supporting plate 311 of FIGS. 4 and 6) configured to define at least a portion of the acoustic waveguide and support either the first area or the second area, a second display (e.g., the sub display 152 of FIGS. 1 and 2 or the second display 303 of FIGS. 4 and 6) disposed on another surface of the first supporting plate, and a speaker module (e.g., the speaker module 304 of FIGS. 4 and 6) disposed on the other surface of the first supporting plate between the first supporting plate and the second display. The acoustic waveguide may be configured to radiate the sound output from the speaker module at one side of the second display to an external space.

According to various embodiments, the electronic device may further comprise at least one camera module (e.g., the sensor or camera module disposed in the first rear area 141 of FIG. 1 or 2) disposed in the other of the first housing and the second housing. In the first position, the camera module may be configured to capture a subject along a direction opposite to, or inclined from, a direction in which the acoustic waveguide radiates the sound to the external space.

According to various embodiments, the first supporting plate may include a side bezel structure (e.g., the side surfaces 113*a*, 113*b*, 113*c*, 123*a*, 123*b*, and 123*c* of FIGS. 1 and 2 or the side bezel structure 313 of FIGS. 4 and 6) disposed to at least partially surround a space between the first display and the second display. The side bezel structure may be at least partially disposed adjacent to an edge of the first display or the second display and be configured to define another portion of the acoustic waveguide.

According to various embodiments, the electronic device may further comprise an opening area (e.g., the opening area 343 of FIGS. 4 and 6) formed through the first supporting plate and a slit (e.g., the slits 153 and 345 of FIGS. 1, 2, and/or 4 and 6) formed adjacent to an edge of the first supporting plate. The acoustic waveguide may be configured to receive the sound output from the speaker module through the opening area and radiate sound to the external space through the slit.

According to various embodiments, the first display may be attached to the first supporting plate and be configured to define another portion of the acoustic waveguide between the opening area and the slit.

According to various embodiments, the electronic device may further comprise a dummy plate (e.g., the dummy plate 329 of FIG. 4) disposed on one surface of the first supporting plate. The dummy plate may be configured to support a portion of the first display while defining another portion of the acoustic waveguide between the opening area and the slit.

According to various embodiments, the electronic device may further comprise a side bezel structure disposed to at least partially surround a space between the first display and the second display, a second supporting plate (e.g., the second supporting plate 317 of FIGS. 4 and 6) disposed in the space between the speaker module and the second display and a slit formed between a portion of the second display and a portion of the side bezel structure. The acoustic waveguide may be configured to be connected to the external space through the slit.

According to various embodiments, the second display may include a transparent plate (e.g., the transparent plate 331 of FIGS. 4 and 6) having a portion which is disposed to, along with a portion of the side bezel structure, define the slit and a display panel (e.g., the second display panel 333 of FIGS. 4 and 6) provided on an inner surface of the transparent plate and disposed between the transparent plate and the second supporting plate.

According to various embodiments, the electronic device may further comprise a side bezel structure disposed to at least partially surround a space between the first display and the second display, an opening area formed through the first supporting plate, and a slit formed between a portion of the second display and a portion of the side bezel structure. The acoustic waveguide may be configured to receive the sound output from the speaker module through the opening area and radiate sound to the external space through the slit.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
an acoustic waveguide;
a first supporting plate configured to define at least a portion of the acoustic waveguide on one surface;
a first display disposed on one surface of the first supporting plate;
a second display disposed on another surface of the first supporting plate; and
a speaker module disposed on the other surface of the first supporting plate between the first supporting plate and the second display,
wherein the acoustic waveguide is configured to radiate sound output from the speaker module at one side of the second display to an external space.

2. The electronic device of claim 1, wherein the acoustic waveguide is further configured to radiate the sound to the external space in a direction opposite to, or a direction inclined from, a direction in which the speaker module outputs the sound.

3. The electronic device of claim 1,
wherein the first supporting plate comprises a side bezel structure disposed to at least partially surround a space between the first display and the second display, and
wherein the side bezel structure is at least partially disposed adjacent to an edge of the first display or an edge of the second display and is configured to define another portion of the acoustic waveguide.

4. The electronic device of claim 1, further comprising:
an opening area formed through the first supporting plate; and
a slit formed adjacent to an edge of the first supporting plate,
wherein the acoustic waveguide is configured to receive the sound output from the speaker module through the opening area and radiate sound to the external space through the slit.

5. The electronic device of claim 4,
wherein the first display is attached to the first supporting plate, and wherein the first display is configured to define another portion of the acoustic waveguide between the opening area and the slit.

6. The electronic device of claim 4, further comprising a dummy plate disposed on one surface of the first supporting plate,
wherein the dummy plate is configured to support a portion of the first display while defining another portion of the acoustic waveguide between the opening area and the slit.

7. The electronic device of claim 1, further comprising:
a side bezel structure disposed to at least partially surround a space between the first display and the second display;
a second supporting plate disposed in the space between the speaker module and the second display; and
a slit formed between a portion of the second display and a portion of the side bezel structure,
wherein the acoustic waveguide is further configured to be connected to the external space through the slit.

8. The electronic device of claim 7, wherein the second display comprises:
a transparent plate having a portion which is disposed to, along with a portion of the side bezel structure, define the slit; and
a display panel provided on an inner surface of the transparent plate and disposed between the transparent plate and the second supporting plate.

9. The electronic device of claim 8, wherein the display panel is attached to the second supporting plate.

10. The electronic device of claim 7, further comprising an elastic member disposed between the second supporting plate and the speaker module,
wherein the elastic member is configured to bring the speaker module into tight contact with the first supporting plate.

11. The electronic device of claim 1, further comprising:
a side bezel structure disposed to at least partially surround a space between the first display and the second display;
an opening area formed through the first supporting plate; and
a slit formed between a portion of the second display and a portion of the side bezel structure,
wherein the acoustic waveguide is further configured to receive the sound output from the speaker module through the opening area and radiate sound to the external space through the slit.

12. The electronic device of claim 1, further comprising:
a first housing and a second housing configured to pivot relative to each other between a first position where the first housing and the second housing are disposed to face each other and a second position where the first housing and the second housing are unfolded from each other at a designated angle from the first position; and
a hinge module disposed between the first housing and the second housing to rotatably connect the first housing and the second housing,
wherein the first display comprises a first area disposed on the first housing, a second area disposed on the second housing and disposed to face the first area in the first position, and a folding area disposed corresponding to an area where the hinge module is disposed and connecting the first area and the second area, and
wherein one of the first housing or the second housing comprises the acoustic waveguide, the first supporting plate, the second display, and the speaker module.

13. The electronic device of claim 12, further comprising at least one camera module disposed in the other of the first housing and the second housing,
wherein in the first position, the camera module is configured to capture a subject along a direction opposite to, or inclined from, a direction in which the acoustic waveguide radiates the sound to the external space.

14. The electronic device of claim 12, wherein the first supporting plate is configured to support either the first area or the second area.

15. The electronic device of claim 12, further comprising:
a side bezel structure disposed to at least partially surround a space between the first display and the second display;
an opening area formed through the first supporting plate; and
a slit formed between a portion of the second display and a portion of the side bezel structure,
wherein the acoustic waveguide is further configured to receive the sound output from the speaker module through the opening area and radiate sound to the external space through the slit.

16. The electronic device of claim 15, wherein the side bezel structure has a frame shape substantially enclosing a space between the first display and the second display.

17. The electronic device of claim 16, wherein the side bezel structure is formed of substantially the same material as the first supporting plate.

18. The electronic device of claim 17,
wherein the side bezel structure at least partially includes an electrically conductive material, and
wherein a portion of the side bezel structure formed of the electrically conductive material is configured to function as a radiation conductor for transmitting and receiving radio signals.

19. The electronic device of claim 17, wherein the side bezel structure is disposed at least partially adjacent to an edge of the first display or the second display.

20. The electronic device of claim 17, wherein the acoustic waveguide is disposed or formed at least partially in a space between the first display and the first supporting plate.

* * * * *